(12) United States Patent
Gonzaga et al.

(10) Patent No.: US 10,401,207 B2
(45) Date of Patent: Sep. 3, 2019

(54) METHOD FOR ASSESSING AND MANAGING SENSOR UNCERTAINTIES IN A VIRTUAL FLOW METER

(71) Applicant: GENERAL ELECTRIC COMPANY, Schenecady, NY (US)

(72) Inventors: Carlos Alberto Cavichioli Gonzaga, Rio de Janeiro (BR); Luiz Felipe Willcox de Souza, Rio de Janeiro (BR); Luiz Ricardo Douat, Rio de Janeiro (BR); Rafael Horschutz Nemoto, Rio de Janeiro (BR)

(73) Assignee: GE Oil & Gas UK, Ltd. (GB)

( * ) Notice: Subject to any disclaimer, the term of this patent is extended or adjusted under 35 U.S.C. 154(b) by 153 days.

(21) Appl. No.: 15/265,575

(22) Filed: Sep. 14, 2016

(65) Prior Publication Data

US 2018/0073902 A1     Mar. 15, 2018

(51) Int. Cl.
*G01F 1/74*    (2006.01)
*G01F 1/34*    (2006.01)
(Continued)

(52) U.S. Cl.
CPC .............. *G01F 1/74* (2013.01); *E21B 47/12* (2013.01); *G01F 1/34* (2013.01); *G01F 1/68* (2013.01);
(Continued)

(58) Field of Classification Search
CPC ........ E21B 47/10; E21B 49/08; E21B 49/081; E21B 49/10; G01F 1/74
(Continued)

(56) References Cited

U.S. PATENT DOCUMENTS 3,913,398 A    10/1975  Curtis
4,168,624 A *   9/1979  Pichon ..................... G01F 1/74
                                                      73/19.01
(Continued)

FOREIGN PATENT DOCUMENTS

CN      202281632 U    6/2012
CN      106918377 A    7/2017
(Continued)

OTHER PUBLICATIONS

Gryzlov, A., et al.; "Inverse Modelling of the Inflow Distribution for the Liquid/Gas Flow in Horizontal Pipelines", 14th International Conference on Multiphase Production Technology, Jun. 17-19, Cannes, France, Number of pp. 15, 2009.
(Continued)

*Primary Examiner* — Peter J Macchiarolo
*Assistant Examiner* — Mohammed E Keramet-Amircolai
(74) *Attorney, Agent, or Firm* — Baker Hughes Patent Organization

(57) ABSTRACT

The present approach relates to establishing metrics for the computation of uncertainty boundaries for mean values for pressure and temperature drop error and mean values for mass flow error. Using such metric, sensor inaccuracies may be accounted for in the calibration and/or estimation processes of a virtual flow meter. For example, these values may be employed in the assessment of improvement in a calibration process of virtual flow meters, which will facilitate maintaining the accuracy of such virtual flow meters.

18 Claims, 11 Drawing Sheets

(51) Int. Cl.
    *G01F 1/68*     (2006.01)
    *G01F 1/76*     (2006.01)
    *G01F 25/00*     (2006.01)
    *E21B 47/12*     (2012.01)
    *G01F 1/50*     (2006.01)
    *G01F 15/00*     (2006.01)

(52) U.S. Cl.
    CPC ............ *G01F 1/76* (2013.01); *G01F 25/0007* (2013.01); *G01F 1/50* (2013.01); *G01F 15/00* (2013.01)

(58) Field of Classification Search
    USPC .................. 73/1.35, 152.27, 152.28, 152.29
    See application file for complete search history.

(56) References Cited

U.S. PATENT DOCUMENTS

| | | | |
|---|---|---|---|
| 5,983,164 | A | 11/1999 | Ocondi |
| 6,352,001 | B1 | 3/2002 | Wickert et al. |
| 6,546,811 | B2 | 4/2003 | Fincke |
| 6,772,082 | B2 | 8/2004 | van der Geest et al. |
| 6,941,254 | B2 | 9/2005 | Duret et al. |
| 7,054,764 | B2 | 5/2006 | Williams et al. |
| 7,474,969 | B2 | 1/2009 | Poulisse |
| 7,654,151 | B2 | 2/2010 | Agar et al. |
| 7,674,624 | B2 | 3/2010 | Stephenson et al. |
| 7,725,301 | B2 | 5/2010 | Shah et al. |
| 8,073,665 | B2 | 12/2011 | Watters et al. |
| 8,136,414 | B2 | 3/2012 | Steven |
| 8,170,801 | B2 | 5/2012 | Foot et al. |
| 8,244,509 | B2 | 8/2012 | Banerjee et al. |
| 2004/0255695 | A1* | 12/2004 | Gysling ................ G01F 1/7082 73/862 |
| 2005/0149264 | A1 | 7/2005 | Tarvin et al. |
| 2006/0162466 | A1 | 7/2006 | Wargo et al. |
| 2007/0068672 | A1 | 3/2007 | Jalali et al. |
| 2007/0157737 | A1* | 7/2007 | Gysling ................ G01F 1/667 73/861.23 |
| 2007/0192046 | A1* | 8/2007 | Hairston ............. G01F 25/0053 702/45 |
| 2007/0213963 | A1 | 9/2007 | Jalali et al. |
| 2008/0125916 | A1 | 5/2008 | Ellender et al. |
| 2008/0257544 | A1* | 10/2008 | Thigpen ................ E21B 43/14 166/250.01 |
| 2008/0300802 | A1 | 12/2008 | Lakhani et al. |
| 2009/0112491 | A1 | 4/2009 | Nakada et al. |
| 2009/0149969 | A1 | 6/2009 | Sluphaug et al. |
| 2009/0293634 | A1 | 12/2009 | Ong |
| 2009/0308601 | A1 | 12/2009 | Poe, Jr. et al. |
| 2010/0023269 | A1 | 1/2010 | Yusti et al. |
| 2010/0094569 | A1 | 4/2010 | Gysling |
| 2010/0095758 | A1* | 4/2010 | Georgi ................ E21B 49/083 73/152.28 |
| 2010/0324873 | A1 | 12/2010 | Cameron |
| 2011/0040485 | A1 | 2/2011 | Ong |
| 2011/0088484 | A1* | 4/2011 | Camilleri ................ G01F 1/34 73/861.42 |
| 2011/0226469 | A1* | 9/2011 | Lovell ................ E21B 47/1005 166/250.01 |
| 2011/0301851 | A1* | 12/2011 | Briers ................ E21B 43/00 702/12 |
| 2011/0307104 | A1 | 12/2011 | Smirnov |
| 2012/0209542 | A1 | 8/2012 | Gysling |
| 2013/0008235 | A1 | 1/2013 | Nilsson |
| 2014/0137642 | A1* | 5/2014 | Henry ................ E21B 21/063 73/152.29 |
| 2014/0150520 | A1* | 6/2014 | Khan ................ E21B 47/10 73/1.35 |
| 2015/0211357 | A1* | 7/2015 | Chen ................ E21B 47/06 73/152.27 |
| 2015/0226051 | A1* | 8/2015 | Machado ................ E21B 47/06 166/250.03 |
| 2015/0354345 | A1* | 12/2015 | Meier ................ G01F 1/7086 73/1.16 |
| 2016/0076926 | A1 | 3/2016 | McCann et al. |
| 2018/0087954 | A1 | 3/2018 | Gonzaga et al. |

FOREIGN PATENT DOCUMENTS

| | | |
|---|---|---|
| EP | 2 486 236 A2 | 8/2012 |
| WO | 2007116008 A1 | 10/2007 |
| WO | 2009019591 A2 | 2/2009 |
| WO | 2010138595 A1 | 12/2010 |
| WO | 2015073626 A1 | 5/2015 |
| WO | 2018/058511 A1 | 4/2018 |

OTHER PUBLICATIONS

Finsterle, S., et al.; "TOUGH: Model Use, Calibration, and Validation", American Society of Agricultural and Biological Engineers, vol. 55, Issue: 4, pp. 1275-1290, 2012.

Lorentzen, R. J., et al., "Tuning of parameters in a two-phase flow model using an ensemble Kalman filter," International journal of multiphase flow, vol. 29, No. 8, pp. 1283-1309 (Jul. 10, 2003).

"Uncertainty of measurement—Part 3: Guide to the expression of uncertainty in measurement (GUM:1995)," ISO/IEC Guide 98-3, pp. 1-129 (Sep. 30, 2008).

International Search Report and Written Opinion issued in connection with corresponding PCT Application No. PCT/US17/45667 dated Nov. 17, 2017.

* cited by examiner

METHOD FOR ASSESSING AND MANAGING SENSOR UNCERTAINTIES IN A VIRTUAL FLOW METER

BACKGROUND

The subject matter disclosed herein relates to the use of virtual flow metering in resource production contexts, such as oil and gas production.

In various contexts where a fluid medium, either liquid or gas, is flowed between various locations, the control of the flow may be controlled at least in part using measured flow aspects. Various types of flow meters may be provided to provide data on the flow of the fluid at a given time and at a given location. By way of example, in a hydrocarbon production context, flow meters may measure flow at one or more locations in the production path to provide data on the flow of the production fluid through various parts of the production system.

By way of example, two types of flow meter technologies are physical flow meters and virtual flow meters. In the context of physical multiphase flow meters, these flow meters typically estimate the flow rate of each phase in question by utilizing a combination of techniques, which may each in turn utilize various electronic sensing devices, such as microwave sensors, electrical impedance sensors, doppler ultrasound sensors, gamma ray sensors, and so forth.

There may be various drawbacks associated with the use of physical flow meters, including cost (since expensive sensors are typically employed), reliability (since complex sensors are typically more susceptible to failure), communication and power supply issues (e.g., high power consumption to keep sensors working demands specific umbilical pipes), and precision and accuracy (generally, physical flow meters present measurement errors due to the complexity of a multiphase flow).

Virtual flow meters may also utilize various sensor systems and algorithms for estimating flow rates. However, virtual flow meters typically make use of less complex types of sensors (e.g. temperature and pressure sensors) from whose measurements flow data is estimated. Both the physical and virtual flow metering approaches typically utilize complex data-fusion algorithms for estimating flow rates based on the measurements provided by the sensing units.

The maintenance of virtual flow meter accuracy over the life of a production site (e.g., an oil or gas field) is one challenge to the successful deployment of virtual flow meters at certain sites, such as subsea locations. The use of virtual flow meters may be subject to errors attributable primarily to two sources: models and sensor measurements. Model errors may be related either to mathematical modeling not adequately addressing the underlying physics or wrong (or varying) parameter assumptions (pipe roughness variation due to the incrustation of minerals, diameter variation due to the formation of wax, and so forth). Sensor measurements can be subjected to bias, drifts, precision degradation, or even total sensor failure. Thus, in order to maintain the estimation performance of the virtual flow meter, it must be periodically tuned to address these potential sources of error. However, assessment of such changes may be difficult in a non-controlled production site.

By way of example, the sensors in question may be prone to inaccuracies. If these inaccuracies are not explicitly taken into account in the tuning of a virtual flow meter, only mean values are available as sources of information for the calibration and estimation processes. Calibration improvement based solely on mean values can be misleading or erroneous, thus preventing proper tuning of the virtual flow meter.

BRIEF DESCRIPTION

In one embodiment, a virtual flow meter is provided comprising a processor-based controller. The processor-based controller is configured to: select or receive a selection of an operating point related to a given flow rate of a phase of a production fluid; select or receive a selection of a nominal case (uncertainty-free case); based on the operating point and the nominal case, generate a calculated outlet pressure and a calculated outlet temperature at a segment of interest. The processor-based controller is further configured to, for each combination of a measured inlet pressure and associated error, a measured inlet temperature and associated error, a measured gas mass flow rate and associated error, a measured oil mass flow rate and associated error, and a measured water mass flow rate and associated error: derive an outlet pressure and an outlet temperature at the segment for each combination; calculate an outlet pressure difference between the calculated outlet pressure for the nominal case and the outlet pressure calculated for each combination; and calculate an outlet temperature difference between the calculated outlet temperature for the nominal case and the outlet temperature calculated for each combination. The processor-based controller is also configured to determine the largest outlet pressure difference and the largest outlet temperature difference for the combinations; and select the largest outlet pressure difference and the largest outlet temperature difference as uncertainties related to, respectively, the outlet pressure and outlet temperature calculated for the nominal case.

In a further embodiment, a processor-based method is provided for determining uncertainties associated with outlet temperature and outlet pressure of a segment of a fluid production network. The processor-based method includes the act of selecting or receiving a selection of an operating point related to a given flow rate of a phase of a production fluid. A nominal case is selected. Based on the operating point and the nominal case, a calculated outlet pressure and a calculated outlet temperature at a segment of interest are generated. For each combination of a measured inlet pressure and associated error, a measured inlet temperature and associated error, a measured gas mass flow rate and associated error, a measured oil mass flow rate and associated error, and a measured water mass flow rate and associated error: an outlet pressure and an outlet temperature are derived at the segment for each combination; an outlet pressure difference is calculated between the calculated outlet pressure for the nominal case and the outlet pressure calculated for each combination; and an outlet temperature difference is calculated between the calculated outlet temperature for the nominal case and the outlet temperature calculated for each combination. The largest outlet pressure difference and the largest outlet temperature difference is determined for the combinations. The largest outlet pressure difference and the largest outlet temperature difference are selected as uncertainties related to, respectively, the outlet pressure and outlet temperature calculated for the nominal case.

In an additional embodiment, a processor-based method is provided for determining a pressure drop error for a segment of a fluid production network. The processor-based method includes the act of determining a calculated pressure drop for the segment by taking the difference between a calculated outlet pressure (related to the nominal case) for the segment and a measured inlet pressure for the segment. A measured pressure drop is determined for the segment by taking the difference between an outlet pressure measurement for the segment and the measured inlet pressure. A pressure drop error is calculated for the segment by taking the difference of the calculated pressure drop and the measured pressure drop.

In another embodiment, a processor-based method is provided for determining a temperature drop error for a segment of a fluid production network. The processor-based method includes the act of determining a calculated temperature drop for the segment by taking the difference between a calculated outlet temperature (related to the nominal case) for the segment and a measured inlet temperature for the segment. A measured temperature drop is determined for the segment by taking the difference between an outlet temperature measurement for the segment and the measured inlet temperature. A temperature drop error is calculated for the segment by taking the difference of the calculated temperature drop and the measured temperature drop.

In a further embodiment, processor-based method is provided for validating a calibration of a multiphase flow model. The processor-based method includes the act of deriving one or more flow rates of interest for a virtual flow meter application employing the multiphase flow model. A flow rate for a phase of interest estimated using the multiphase flow model is compared with a measured flow rate for the phase of interest. As part of the comparison process, uncertainty associated with the flow rates of interest are propagated analytically instead of numerically.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
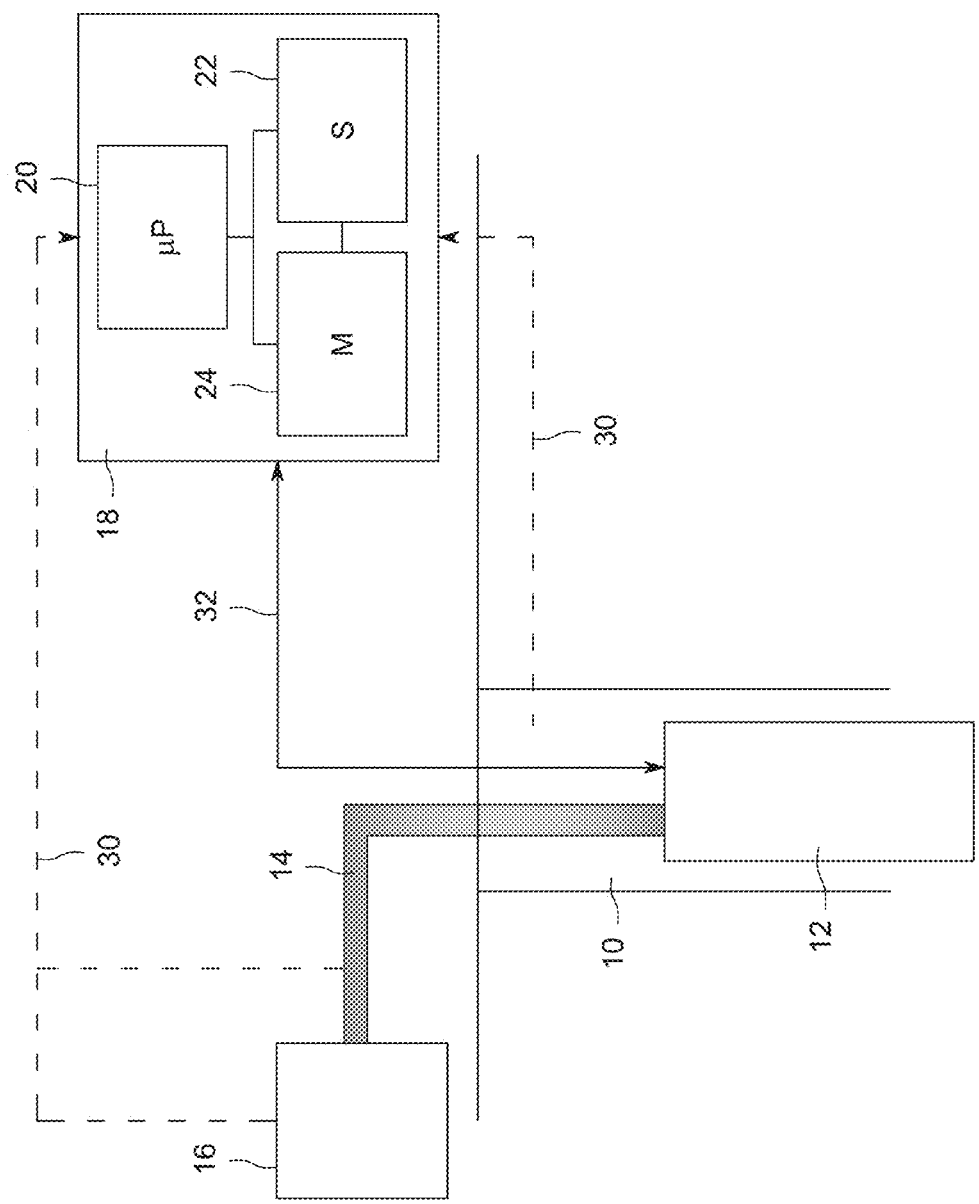
FIG. 1 depicts a generalized view of a resource production system suitable for use with a virtual flow metering algorithm, in accordance with aspects of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As noted above, to maintain the estimation performance of the virtual flow meter, it must be periodically tuned (calibrated) in order to account for changes in the production system. This will allow the virtual flow meter accuracy to be maintained. However, due to the inaccuracies to which sensors are prone, conventional approaches may resort to the use of mean measured values, which are typically available, as sources of information for the calibration and estimation processes, thereby not explicitly accounting for the inaccuracies of the sensors. Use of such mean values may lead to erroneous or misleading results.

With this in mind, the present approach relates to establishing metrics for the computation of uncertainty boundaries for mean values of pressure and temperature drop error and mean values of mass flow error. In this manner sensor inaccuracies may be better accounted for. These values may be employed in the assessment of improvement in a calibration process of virtual flow meters, which will facilitate maintaining the accuracy of such virtual flow meters. Generally, the pressure drop error, given by the difference between the measured pressure drop (by using sensors) and the calculated pressure drop (by using the forward model) in a given pressure loss segment (pipe segment or choke valve), is utilized for assessing the improvement obtained from the calibration process. The mass flow error, given by the difference between the measured mass flow rate (by using a physical multiphase flow meter or other reference mass flow rate meter) and the estimated mass flow rate (by using the inverse model), is utilized for validating the flow rate estimation by using the calibrated virtual flow meter.

With respect to the terminology employed herein, a brief explanation of certain terms is provided here to simplify explanation and facilitate understanding. For example, in certain contexts discussed herein a multiphase flow model may be explicitly or implicitly referenced. Such a multiphase flow model is a physics-based mathematical model that simulates the real flow conditions in the modeled system (e.g., a petroleum production system). In some contexts the term "forward model" is employed to convey utilization of the multiphase flow model using as input(s): (a) inlet flow rates, (b) inlet pressure, and/or (c) inlet temperature. In this forward context, the pressures and/or temperatures along all or part of the production system (e.g., the temperature and/or pressure distribution along a segment) are obtained as output. In this context, the model is solved based on steady state conditions. That is, sensed values such as flow rates, temperatures, and pressures are used in a forward model solving context to derive temperature and pressure within the modeled system, such as along a segment.

Conversely, in some contexts the term "inverse model" is employed to convey solving the model in a manner inverse to the forward approach. In particular, solving the model in the inverse manner uses as input(s): temperatures and/or pressure along the all or part of the production system (e.g., along a segment) and returns as an output the flow rate of one or more phases of interest. That is, a flow rate of one or more phases of interest is derived using temperatures and pressures along a segment or modeled system. However, the multiphase flow model cannot be arithmetically inverted and solved. Hence, as discussed herein, for the inverse approach estimation algorithms are employed for estimating the flow rates. As will be appreciated, this inverse modeling or estimation process by which flow rates for phases of interest are derived corresponds to the operation of the virtual flow meter itself as a means to estimate flow rates given measured temperatures and pressures.

With the preceding in mind, current calibration tools are typically designed to provide an off-line calibration of a steady-steady virtual flow metering solution. These approaches may allow for compensation of model/parameter segment (i.e., individual elements composing the topology of the field, like pipes, chokes, and so forth) errors in the forward model (i.e., calibration process) as well as validation of the calibration procedure based on the computation of the inverse model (estimation process). In this manner, the present approach provides a ground truth for determining if calibration results are effective by considering the propagation of uncertainties associated with the sensor measurements.

Thus, in a production or product context, the calibration process is the process through which physical parameters of the multiphase flow model are varied to obtain a more precise model. By way of example, in a production context the calibration process may correspond to a process by which calibration parameters (such as those listed below) are varied so that the calculated pressure and temperature drops (using the calibrated multiphase flow model) are closer or optimized to the measured pressure and temperature drops (obtained using sensors disposed along the production system). Examples of parameters that may be varied in a production context (e.g., related to pipeline segments) typically act on density, viscosity, roughness, and/or overall heat transfer coefficient (u-value). An example of a calibration parameter for choke valves acts on the valve flow coefficient (Cv).

Conversely, in a production or product context, the estimation process discussed herein refers to the validation of the calibration process utilizing the virtual flow meter (which employs the calibrated multiphase flow model) to certify that the estimated flow rate is close (i.e., within a specified or desired tolerance or threshold) to the measured flow rate. Thus, based on the inverse approach to utilizing the calibrated multiphase flow model, one or more flow rates of interest may be derived in the context of the virtual flow meter and used as a validation of the calibrated flow model by comparing the estimated and actual flow rates for the phase(s) of interest. As discussed herein in this validation process the comparison of the calculated flow rate and measured flow rate benefits from having uncertainty boundaries associated to the mean values.

As a consequence, benefits of the present approach include but are not limited to: (1) propagation of uncertainties and consequent establishment of conservative uncertainty boundaries for mean values of both pressure and temperature drop error (which are utilized for assessing improvements due to the calibration process) at each considered operating point (e.g., given phases of flow rate, such as for gas, oil, and/or water in a multiphase context)); (2) propagation of uncertainties and consequent establishment of conservative uncertainty boundaries for mean values of mass flow error (which are utilized for validating the improvements in the estimation process) at each considered operating point; (3) propagation of uncertainties of the aggregated values of all considered operating points according to three different error metrics (absolute error, square root error and maximal error), for both calibration and estimation processes separately.

With the preceding in mind, a high-level, simplified overview of aspects of a production site and control system employing a virtual flow meter are shown in FIG. 1. In this example, a hydrocarbon production site is depicted. Such a site may be subsea or on-shore. In this example, the site includes a downhole environment (e.g., a wellbore 10) in which a downhole tool 12 is positioned. The downhole tool 12 may include one or more pumps, such as electric submersible pumps (ESPs), that facilitate the movement of a production fluid 14 from the downhole environment to a downstream facility 16, such as storage tanks, separators or separation tanks, and so forth.

In the depicted example, the flow of the production fluid 14 may be controlled at least in part by the operation of the downhole tool 12 or, in alternative approaches by changing the opening of choke valves located in production manifolds, Xmas trees, a topside separator, or other flow diversion or restriction locations in the production flow path. With reference to the depicted example, the operation of the downhole tool 12 is, in this example, controlled at least in part by the operation of a controller 18 configured to implement a virtual flow meter as discussed herein. Though the downhole tool 12 in this example is depicted as being in communication with, and operated based on, the controller 18, it should be appreciated that other pumps or flow control devices may be operated based on the controller 18 in addition to or instead of the downhole tool 12. For example, the controller 18 (or other similarly configured controllers 18 at the site) may control other devices or components that cause the flow of the production fluid 14 between locations at the monitored site.

In the depicted embodiment, the controller 18 is a processor-based controller, having at least one microprocessor 20 to execute an algorithm corresponding to a virtual flow meter. For example, the microprocessor 20 may execute stored routines corresponding to the virtual flow meter algorithms (including routines for virtual flow meter calibration and for addressing sensor inaccuracies as discussed herein) stored in a storage 22 and/or memory 24 of the controller 18. The processor 20 may also access sensor data 30 acquired from one or more sensor (e.g., pressure and/or temperature sensors, and/or flow rates of gas, oil, and/or water measured using multiphase flow meters) located at locations (as shown by dashed lines 30) in the fluid flow path. In the same manner, in certain embodiments sensor and/or operational data may be provided to the controller 18 by a tool 12 responsible for the flow of the production fluid 14. Though the controller 18 is depicted in FIG. 1 as a stand-alone or specially programmed device, it should be understood that the functionality of the controller 18 (e.g., executing routines for implementing a virtual flow meter algorithm calibration that addresses sensor inaccuracies as discussed herein) may be one set of routines executed on a computer or other processor-based system that, in addition, executes other routines and performs other functions. Further, though a processor-based implementation is shown in FIG. 1, in alternative implementations the controller 18 may be implemented as one or more application-specific integrated circuits specifically programmed to perform the routines associated with the virtual flow meter described herein when provided with the proper inputs.

In the depicted example, the controller 18 receives sensor input data, such as from pressure, temperature, and/or mass flow sensors in the fluid flow path, and acts as virtual flow meter, generating an estimate of the flow of the production fluid 14 at one or more locations in the monitored site. The flow estimates in the depicted example may be used to generate a control signal 32 used to control the operation of one or more flow controlling devices, such as pumps, valves, and so forth. In the depicted example, the control signal 32 is used to control operation of the downhole tool 12, such as an electrical submersible pump or other pumping device. In this manner, based on the flow estimated by the virtual flow meter implemented on controller 18, the operation of one or more flow controlling devices may be controlled so as to stay within desired production parameters.

As discussed herein, the present approach provides a ground truth for determining if virtual flow meter calibration results are effective by considering the propagation of sensor measurement uncertainties. By way of example, in certain implementations, sensor uncertainties are propagated according to certain rules.

For example, the additive (random) error $\sigma_f$ associated with $f(x_1, x_2, \ldots, x_n)$, which is a function defined for the uncorrelated uncertain variables $x_1 \pm \sigma_{x_1}$, $x_2 \pm \sigma_{x_2}$, ..., $x_n \pm \sigma_{x_n}$, can be computed as:

$$\sigma_f = \sqrt{\left(\frac{\partial f}{\partial x_1}\sigma_{x_1}\right)^2 + \left(\frac{\partial f}{\partial x_2}\sigma_{x_2}\right)^2 + \ldots + \left(\frac{\partial f}{\partial x_n}\sigma_{x_n}\right)^2} \quad (1)$$

Some important particularizations of this rule, which are used in the present approach are as follows:

With respect to the sum or difference ($f=x_1 \pm x_2$)

$$\sigma_f = \sqrt{\sigma_{x_1}^2 + \sigma_{x_2}^2} \quad (2)$$

With respect to the product or quotient ($f=x_1 x_2$, $f=x_1/x_2$)

$$\in_f = \sqrt{\in_{x_1}^2 + \in_{x_2}^2} \quad (3)$$

where $\in_x \equiv \sigma x/x$
Root mean square $$\left(f = \sqrt{\frac{x_1^2 + \ldots x_n^2}{n}}\right)$$

$$\sigma_f = \sqrt{\frac{x_1^2 \sigma_{x_1}^2 + \ldots + x_n^2 \sigma_{x_n}^2}{(x_1^2 + \ldots + x_n^2)n}} \quad (4)$$

Calibration Process—Forward Model Uncertainty Propagation

Figure 2:
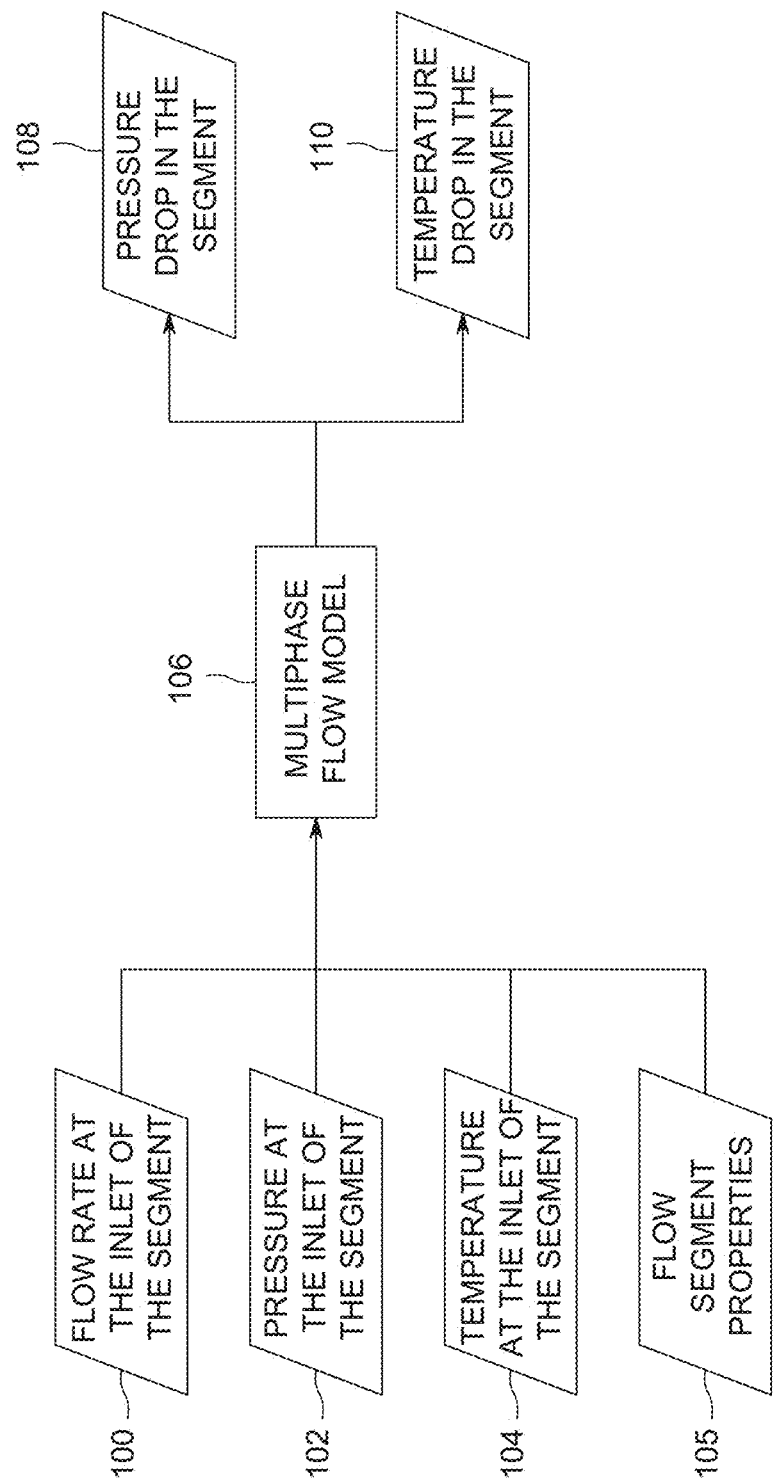
FIG. 2 depicts a process for calculating pressure and/or temperature drops in a flow segment, in accordance with aspects of the present disclosure.

With the preceding in mind, and turning to FIG. 2, during the segment calibration process, input information from multiphase flow, pressure, and temperature sensors (flow measurements 100 (e.g., flow rate at the inlet of a modeled segment), pressure measurements 102 (e.g., pressure at the inlet of the modeled segment), temperature measurements 104 (e.g., temperature at the inlet of the modeled segment)), along with parameterized flow segment properties 105 are used as inputs to a multiphase flow model 106. Examples of flow segment properties include, but are not limited to: pipe topology, tube geometry (e.g., diameter, roughness, length, and so forth), valves, fluid properties, and so forth. Using these inputs and solving for the multiphase flow model 106 in a forward manner yields outputs corresponding to one or both of pressure drop 108 and/or temperature drop 110 in the segment of interest. In conventional approaches, these sensor measurements include unaccounted for uncertainty. The herein described methodology allows calculating the uncertainties on pressure drop and temperature drop due to sensors measurement errors as described below.

Figure 3:
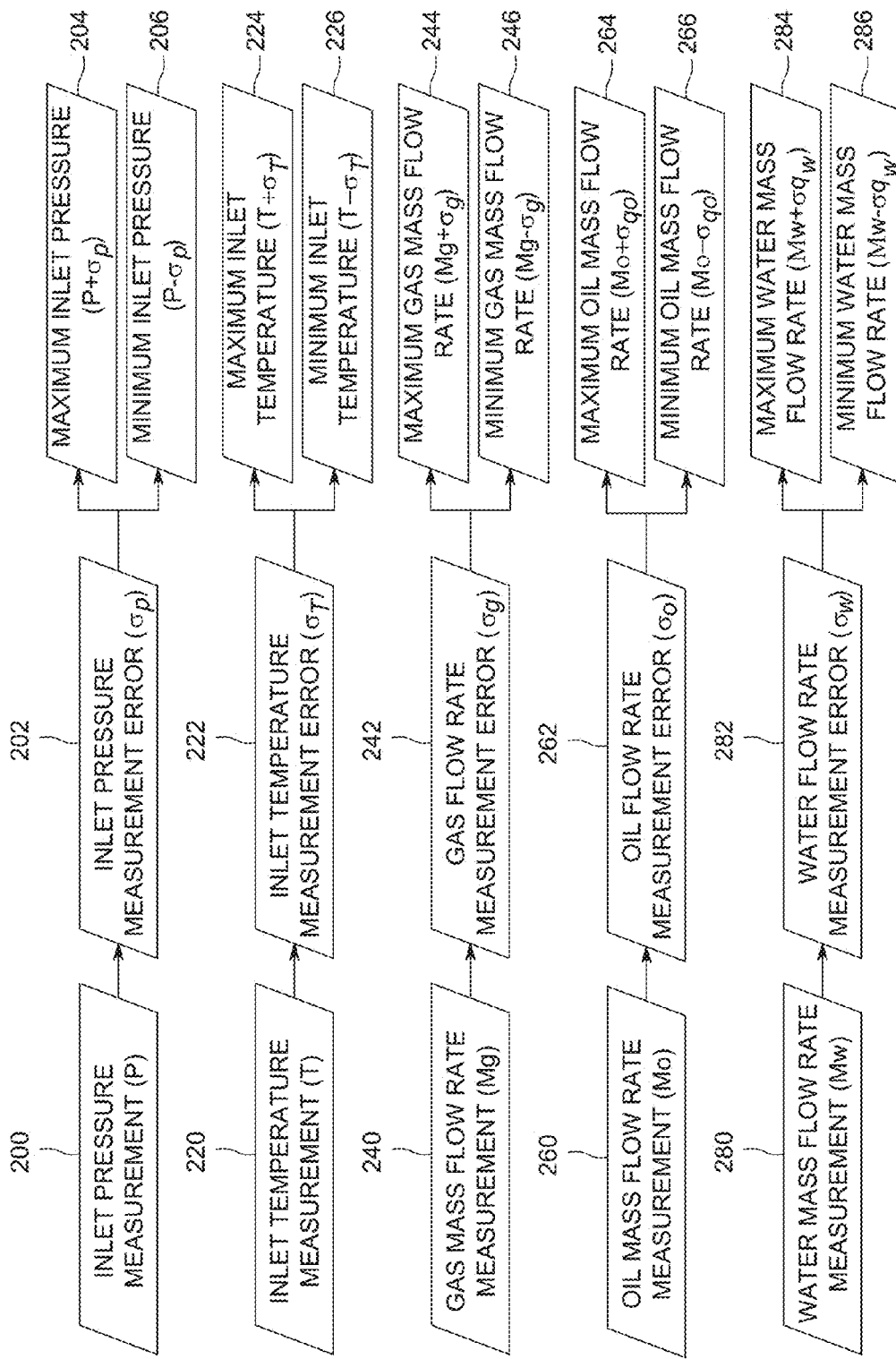
FIG. 3 depicts the maximum and minimum values associated with measurements, given the measurements mean values and measurement errors, in accordance with aspects of the present disclosure.

Consider the polytope whose vertices are formed by all possible combinations of the limit values of the relevant input uncertain quantities (e.g., a hypothetical oilfield having a forward model equation with five uncertain sensor measurements in the segment input—pressure, temperature, and oil, water and gas mass flows—will form a polytope with $2^5=32$ vertices). For example, as shown in FIG. 3, inlet pressure measurements (P) 200 for a segment of interest over a time interval may be used to derive an inlet pressure measurement error ($\sigma_P$) 202 and in turn a maximum inlet pressure (P+$\sigma_P$) 204 and a minimum inlet pressure (P-$\sigma_P$) 206 are determined. Similarly, inlet temperature measurements (T) 220 for the segment of interest over the time interval may be used to derive an inlet temperature measurement error ($\sigma_T$) 222 and in turn a maximum inlet temperature (T+$\sigma_T$) 224 and a minimum inlet temperature (T-$\sigma_T$) 226. For phase flow rates, gas mass flow rate measurements (Mg) 240, oil mass flow rate measurements (Mo) 260, and water mass flow rate measurements (Mw) 280 for the segment of interest over the time interval are obtained. These measures are in turn used to derive corresponding gas flow rate measurement error ($\sigma_g$) 242, oil flow rate measurement error ($\sigma_o$) 262, and water flow rate measurement error ($\sigma_w$) 282. From these mass flow rate measurements and errors, corresponding maximum gas mass flow rate (Mg+$\sigma_g$) 244, minimum gas mass flow rate (Mg-$\sigma_g$) 246, maximum oil mass flow rate (Mo+$\sigma_o$) 264, minimum oil mass flow rate (Mo-$\sigma_o$) 266, maximum water mass flow rate (Mw+$\sigma_w$) 284, and minimum water mass flow rate (Mw−$\sigma_w$) 286 are determinable. These various maximum and minimum values yield 32 combinations of inlet pressure, inlet temperature, gas flow rate, oil flow rate, and water flow rate.

Figure 4A:
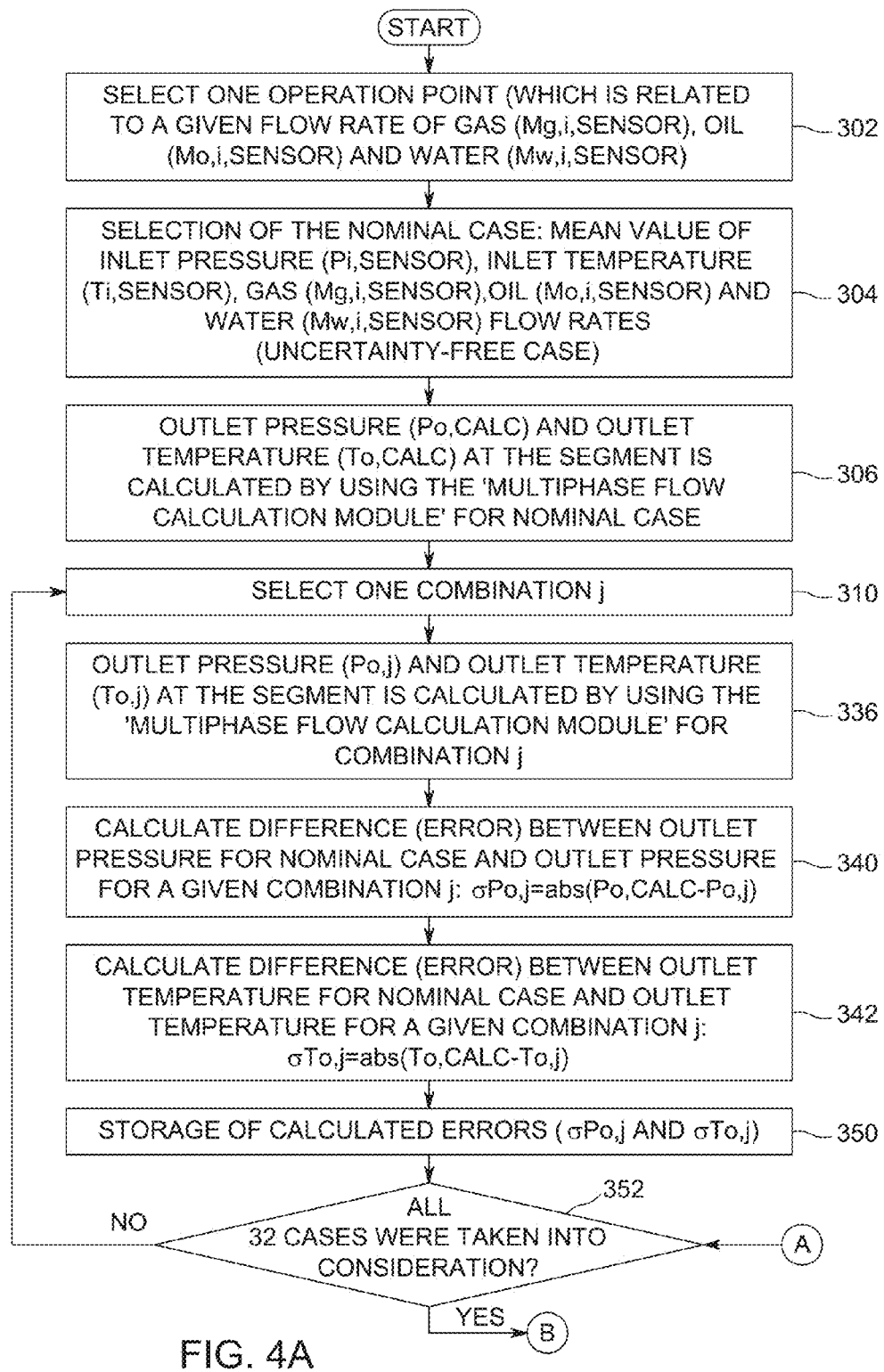
FIGS. 4A and 4B in combination depict a process flow by which uncertainties are determined for calculated outlet pressure and/or outlet temperature, in accordance with aspects of the present disclosure.
Figure 4B:
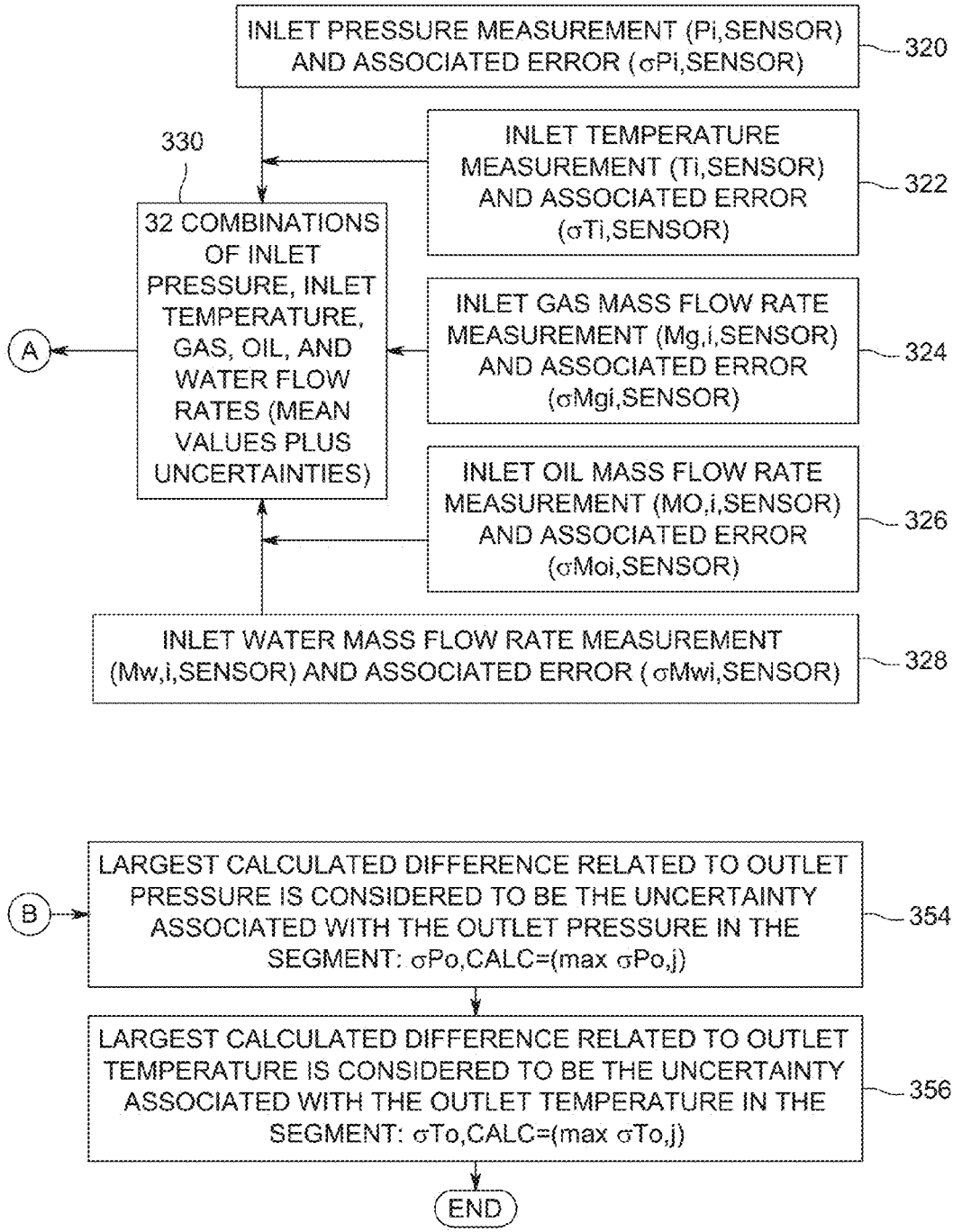

Each vertex (i.e., combination) is used as input to the forward model; the difference (i.e., error) between the obtained output (outlet pressure and/or temperature) and the one computed with uncertainty-free inputs (the nominal case) is stored. After passing through all vertices, the largest obtained error is considered to be the uncertainty associated with the respective segment output at a particular operating point. With the preceding in mind, FIG. 4 depicts an overview of portions of this process related to the uncertainty associated with a segment output (outlet temperature To and outlet pressure Po) for a given operating point. In this example, an operation point is selected (block 302) that is related to a given flow rate of gas, oil, or water and having a corresponding inlet sensor. As shown in FIG. 4, at the next step 304, selection of the nominal (i.e., uncertainty-free) case occurs (i.e., the mean value of the inlet pressure, inlet temperature, or gas, water, or oil flow rates). Next (block 306), outlet pressure and outlet temperature for the segment of interest is calculated using the multiphase flow calculation model for the selected nominal case. As part of this calculation process, a suitable combination of the mean parameter values incorporating uncertainty is selected (block 310).

As discussed in greater detail above, the selected combination at step 310 is made from the 32 combinations (block 330) of respective mean values+/− uncertainties that are determined based upon the inlet measurements and associated error for: pressure (block 320), temperature (block 322), gas mass flow rate (block 324), oil mass flow rate (block 326), and water mass flow rate (block 328). At the next step 336, for the selected combination the outlet pressure and outlet temperature for the segment of interest is calculated using the multiphase flow calculation model.

The difference (i.e., error) between the outlet pressure for the nominal case and the outlet pressure for a given combination is calculated (block 340), such as via:

$$\sigma Po, j = \text{abs}(Po, \text{calc} - Po, j). \quad (5)$$

Similarly, in a parallel or subsequent step, the difference (i.e., error) between the outlet temperature for the nominal case and the outlet temperature for a given combination is calculated (block 342), such as via:

$$\sigma To, j = \text{abs}(To, \text{calc} - To, j). \quad (6)$$

In the depicted example, the calculated errors $\sigma Po, j$ and $\sigma To, j$ are stored (block 350) and any additional combination of mean values with incorporated uncertainty for inlet pressure, temperature, and flow rate are iterated through (block 352).

Once all combinations have been processed, the largest calculated difference related to outlet pressure (block 354), calculated as:

$$\sigma Po, \text{calc} = (\max \sigma Po, j), \quad (7)$$

is considered to be the uncertainty associated with the outlet pressure in the segment of interest. Similarly, as determined in a parallel or serial step 356, the largest calculated difference related to outlet temperature (block 356), calculated as:

$$\sigma To, \text{calc} = (\max \sigma To, j) \quad (8)$$

is considered to be the uncertainty associated with the outlet temperature in the segment of interest.

Figure 5:
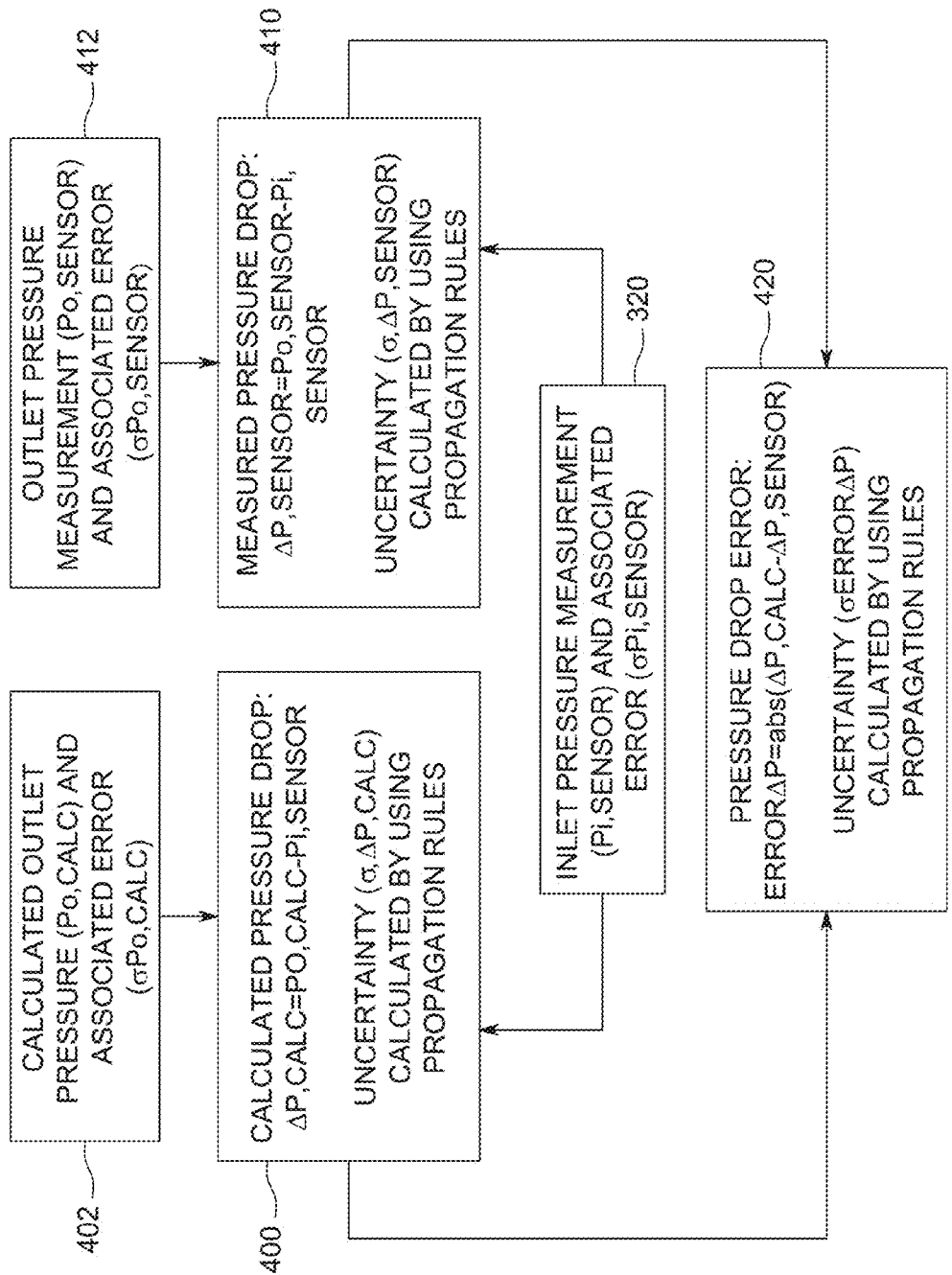
FIG. 5 depicts a process flow for calculating pressure drop error and its associated uncertainty, in accordance with aspects of the present disclosure.

The pressure/temperature drop errors are computed as the difference between the pressure/temperature drop calculated by using the forward model and the sensor pressure/temperature drop measurements. This is shown in greater detail in the process flows of FIGS. 5 and 6 which depicts the steps in determining the uncertainty associated with pressure drop and temperature drop for the operating point in question. In particular, as shown in FIG. 5, pressure drop error for a given segment may be determined by determining both a calculated pressure drop and corresponding uncertainty (i.e., based on the forward model)(block 400) and a measured pressure drop and corresponding uncertainty (i.e., based on sensor data) (block 410). In this example, calculated pressure drop is determined using a calculated outlet pressure (Po, calc) and associated error ($\sigma$Po, calc) (block 402) and the inlet pressure measurement (Pi, sensor) and associated error ($\sigma$Po, sensor) (block 320). In the depicted example, the calculated pressure drop is calculated as:

$$\Delta P, \text{calc} = Po, \text{calc} - Pi, \text{sensor} \quad (9)$$

and the corresponding uncertainty $\sigma\Delta P$, calc is calculated using conventional error propagation rules.

Similarly, the measured pressure drop is determined using a measured outlet pressure (Po, sensor) and associated error ($\sigma$Po, sensor) (block 412) and the inlet pressure measurement (Pi, sensor) and associated error ($\sigma$Po, sensor) (block 320). In the depicted example, the measured pressure drop is calculated as:

$$\Delta P, \text{sensor} = Po, \text{sensor} - Pi, \text{sensor} \quad (9)$$

and the uncertainty $\sigma\Delta P$, sensor is calculated using conventional error propagation rules.

As shown in the process flow of FIG. 5, the calculated pressure drop and uncertainty 400 and measured pressure drop and uncertainty 410 are used to determine the pressure drop error and associated uncertainty 420, such as in accordance with the formula:

$$\text{Error}\Delta P = \text{abs}(\Delta P, \text{calc} - \Delta P, \text{sensor}) \quad (10)$$

with the uncertainty ($\sigma\text{Error}\Delta P$) being calculated in accordance with conventional error propagation rules.

Figure 6:
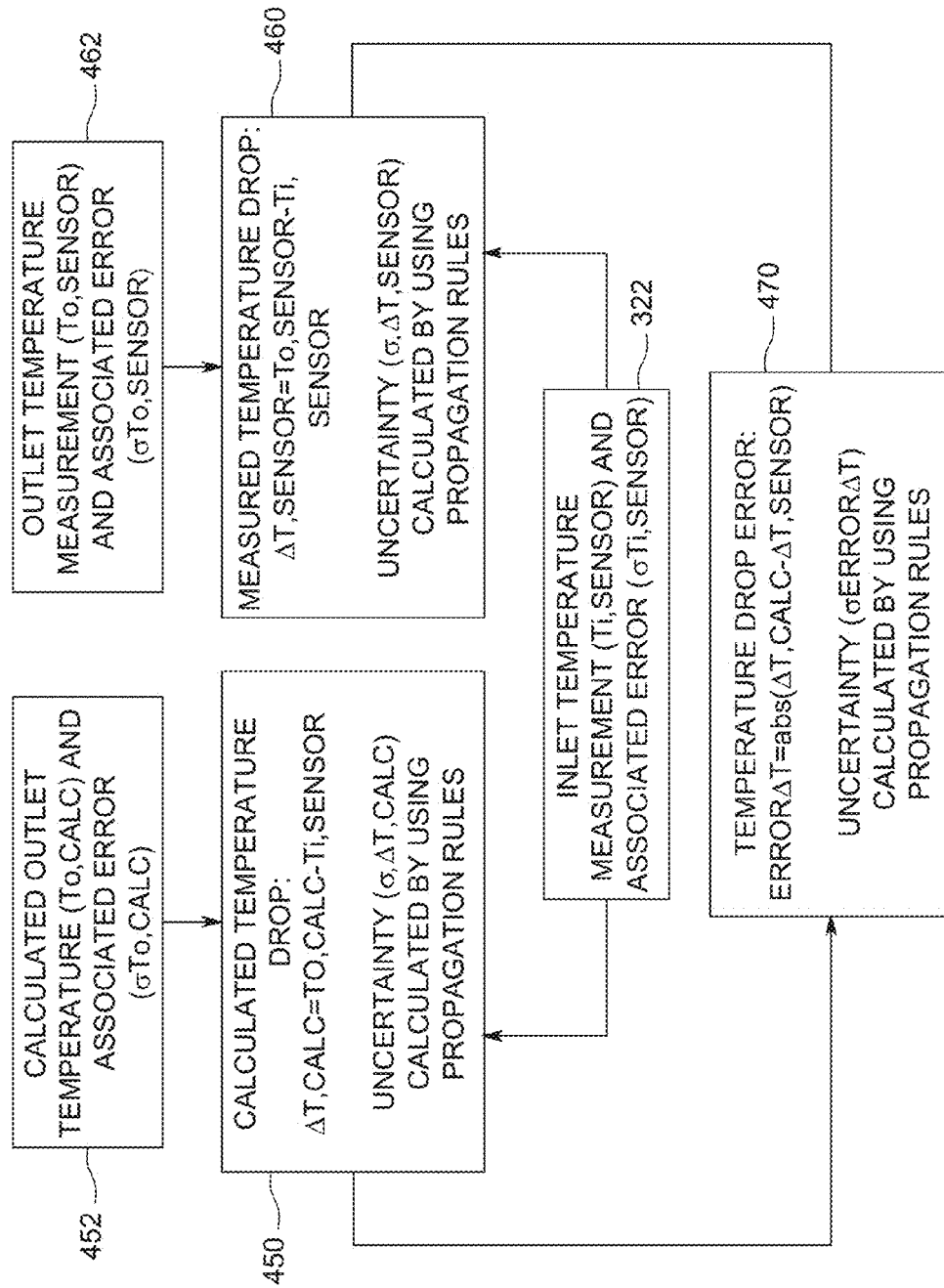
FIG. 6 depicts a process flow for calculating temperature drop error and its associated uncertainty, in accordance with aspects of the present disclosure.

As shown in FIG. 6 a similar process is employed with respect to the determination of a temperature drop error. In this example, temperature drop error for a given segment may be determined by determining both a calculated temperature drop and corresponding uncertainty (i.e., based on the forward model)(block 450) and a measured temperature drop and corresponding uncertainty (i.e., based on sensor data) (block 460). In this example, calculated temperature drop is determined using a calculated outlet temperature (To, calc) and associated error ($\sigma$To, calc) (block 452) and the inlet temperature measurement (Ti, sensor) and associated error ($\sigma$To, sensor) (block 322). In the depicted example, the calculated temperature drop is calculated as:

$$\Delta T, \text{calc} = To, \text{calc} - Ti, \text{sensor} \quad (11)$$

and the corresponding uncertainty $\sigma\Delta T$, calc is calculated using conventional error propagation rules.

Similarly, the measured temperature drop is determined using a measured outlet temperature (To, sensor) and associated error ($\sigma$To, sensor) (block 462) and the inlet temperature measurement (Ti, sensor) and associated error ($\sigma$To, sensor) (block 322). In the depicted example, the measured temperature drop is calculated as:

$$\Delta T, \text{sensor} = To, \text{sensor} - Ti, \text{sensor} \quad (12)$$

and the uncertainty $\sigma\Delta T$, sensor is calculated using conventional error propagation rules.

As shown in the process flow of FIG. 6, the calculated temperature drop and uncertainty 450 and measured temperature drop and uncertainty 460 are used to determine the temperature drop error and associated uncertainty 470, such as in accordance with the formula:

$$\text{Error}\Delta T = \text{abs}(\Delta T, \text{calc} - \Delta T, \text{sensor}) \quad (13)$$

with the uncertainty (σErrorΔT) being calculated in accordance with conventional error propagation rules.

Once the pressure and temperature drop error uncertainties at all operating points are computed, the average values for the different metrics (absolute error, square root error and maximal error), can be calculated based on uncertainty propagation rules.

This is a conservative approach since it is based on an unproven convexity property of the model. Nevertheless, this is a reasonable solution because it provides additional information for the validation of the calibration procedure even in the case of non-convexity with a lower uncertainty boundary being given.

Estimation Process—Inverse Model Uncertainty Propagation

Contrary to what is described above for the forward model uncertainty propagation, in the estimation process an analytical approach is described. By analysing the estimator equation, the uncertainties may be propagated analytically, and not numerically. For example, consider the update equation of the estimated mass flows:

$$\hat{\dot{m}}_k = \hat{\dot{m}}_{k-1} + K_k(\Delta_P - C_k \hat{\dot{m}}_{k-1}) \quad (14)$$

where $\hat{\dot{m}}_k$ is the vector of current-estimated mass flows, $K_k$ is the Kalman gain, $C_k$ is the linearized output equation (forward model) and $\Delta p$ is the vector of pressure drops.

The Kalman gain is a linear map from pressure drop errors to estimated flow rates. When steady state is reached, $\Delta p - C_k \hat{\dot{m}}_{k-1}$ tends to zero. If, instead of considering the nominal pressure drop values $\Delta p$ the uncertain values $\Delta p \pm \sigma_{\Delta p}$ are considered, the pressure drop uncertainties are propagated in steady-state as estimated mass flow uncertainties through the Kalman gain. In this manner, the estimated mass flow uncertainties may be computed based on a weighted sum (weighted by the Kalman filter) of the pressure drop uncertainties. The estimated nominal mass flow errors are computed as the percent difference between estimated and measured nominal mass flows. The associated estimated mass flow error uncertainties at each operating point and average error uncertainty value are obtained through propagation rules.

Simulation Results

With the preceding in mind, various simulation examples are provided for further context and guidance. By way of example, consider a hypothetical simulated gas field comprised of five wells, in a scenario where just one well is producing. The simulation is repeated nine times, one for each operating point (a particular choke opening and consequent gas mass flow).

Figure 7:
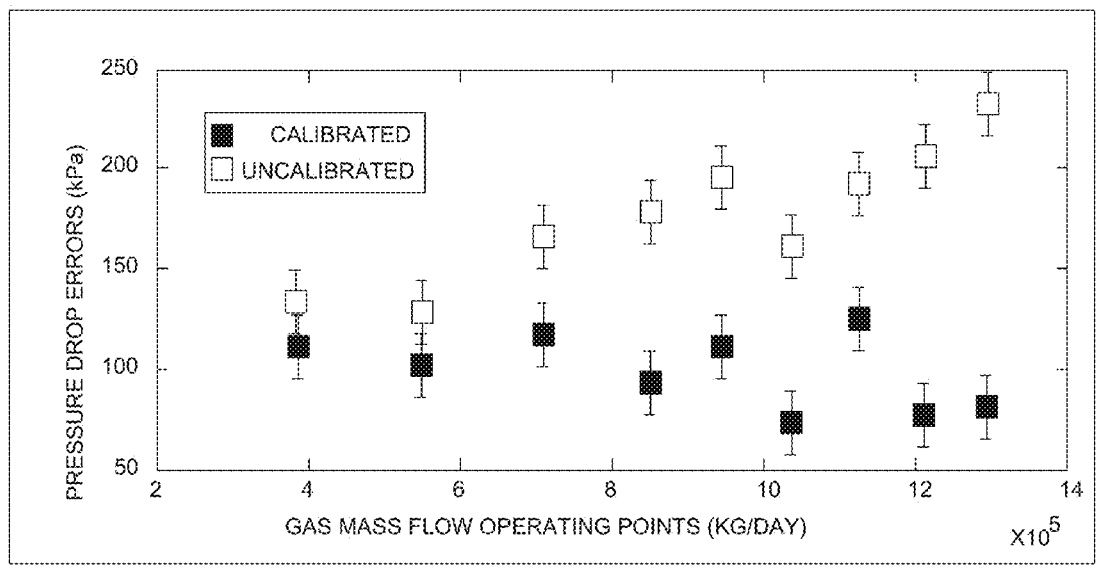
FIG. 7 depicts a graph of simulation results showing calibrated and uncalibrated results for pressure drop error for different operating points (e.g., different gas mass flow rates), in accordance with aspects of the present disclosure.

Turning to FIG. 7, segments of a graph exhibiting uncertainties before (uncalibrated points) and after (calibrated points) are shown for pressure drop error. Pressure drop errors are shown at each considered operating point for a given pressure loss segment, together with their confidence intervals obtained through the propagation of sensor measurement uncertainties. As shown in these results, for pressure drop errors, the first pair of depicted operating points present some overlap in their associated confidence boundaries. The remaining seven operating points clearly do not overlap, indicating that the calibration procedure at these points certainly improved the results (i.e., by reducing the pressure drop errors).

Figure 8:
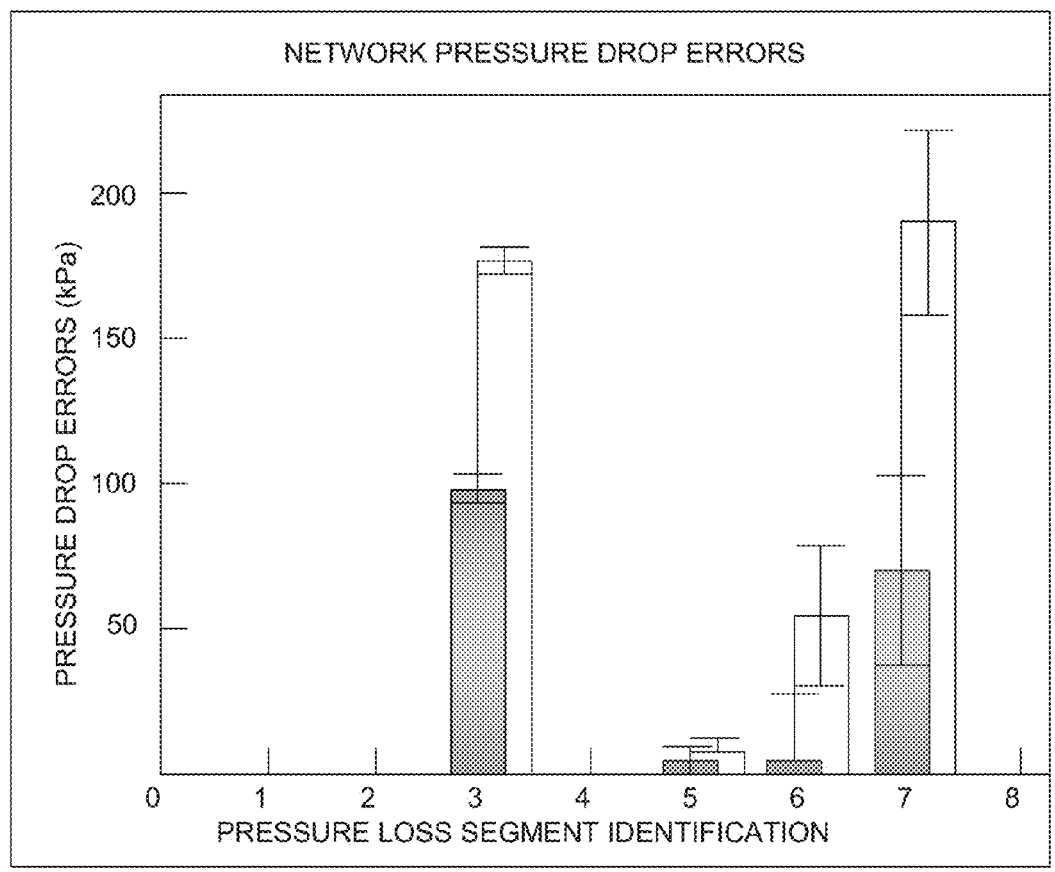
FIG. 8 depicts a graph of forward model calibration results, in which the unshaded bars correspond to pressure drop errors before calibration and the shaded bars correspond to the pressure drop errors after calibration; each pair of bars (unshaded and shaded) represents the pressure drop error for a given pressure loss segment (e.g., pipe segment or choke valve), where the pressure drop error is given by the difference between the measured pressure drop (by using sensors) and the calculated pressure drop (by using the forward model) such that, for each pressure drop error, a corresponding uncertainty boundary is presented, in accordance with aspects of the present disclosure.

Turning to FIG. 8, this figure illustrates the pre- and post-calibration results for all segments involved in the simulated gas field (segments 3, 5, 6 and 7). At each segment, it is possible to observe the results of total pressure drop errors averaged according to the absolute error metric and the respective uncertainty boundaries computed based on the propagation of the individual operating points uncertainties. With the exception of segment number 5, all segments can be said to have their associated pressure drop errors reduced, since no overlap occurs among the uncertainty boundaries before and after calibration.

Figure 9:
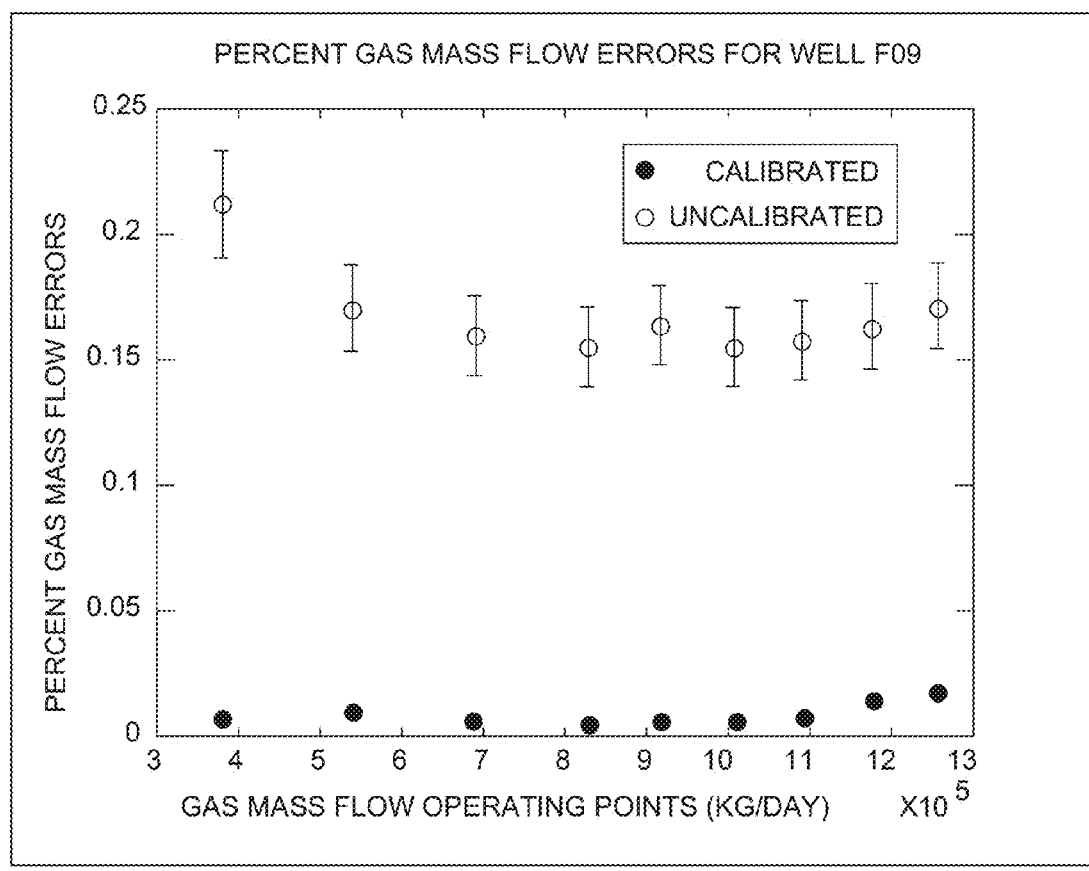
FIG. 9 depicts a graph of simulation results showing calibrated and uncalibrated results for gas mass flow estimation, in accordance with aspects of the present disclosure.

Turning to FIG. 9, gas mass flow estimation errors and their respective uncertainty boundaries for the calibrated and uncalibrated models at different operating points of the considered producing well are shown. The depicted results confirm the improvements resulting from the calibration process (lower calibrated values with no overlaps among uncalibrated and calibrated confidence boundaries).

Figure 10:
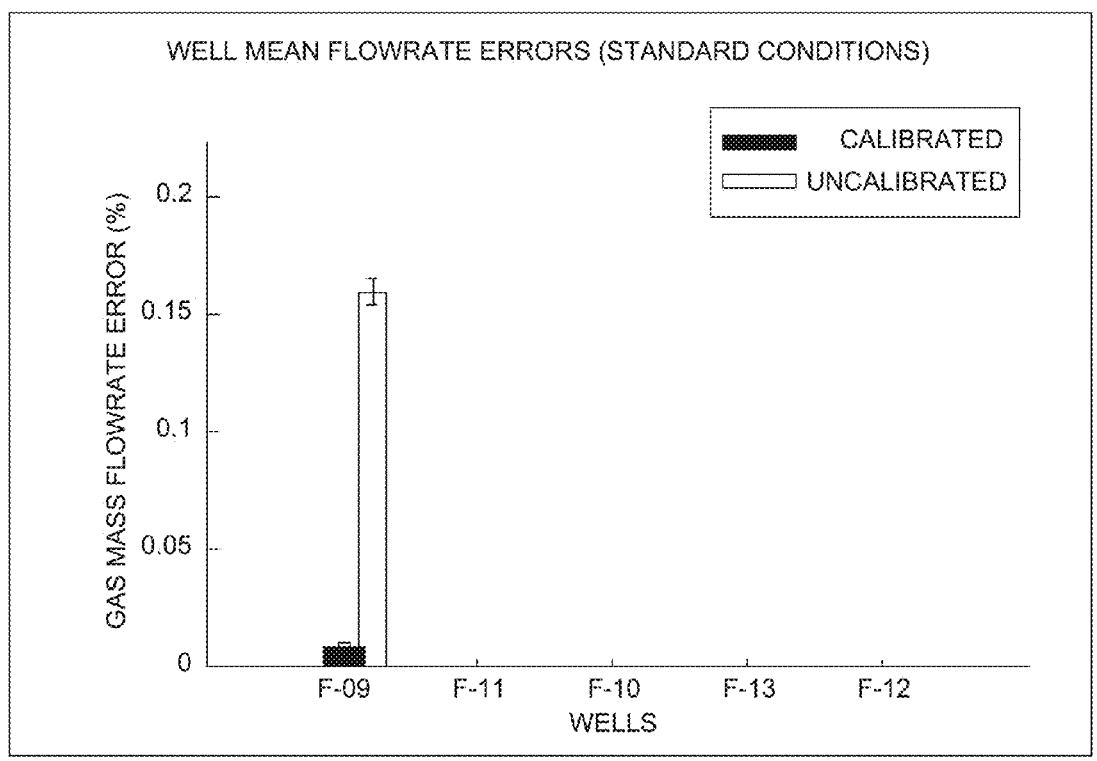
FIG. 10 depicts a graph of simulation results showing calibrated and uncalibrated results for average gas mass flow estimation related to a well denoted 'F-09' (average of all considered operating points), in accordance with aspects of the present disclosure.

Lastly, turning to FIG. 10, the averages (absolute values overall operating points) and related uncertainty intervals in gas mass flow estimations of calibrated and uncalibrated cases are depicted. As in the preceding results, these results confirm that the calibration process was effective in minimizing gas mass flow errors.

Technical effects of the invention include providing a ground truth for determining if calibration results are effective by considering the propagation of uncertainties associated to the sensor measurements. In particular, uncertainties are propagated and uncertainty boundaries established for mean values of one or both of pressure drop error and/or temperature drop error at each considered operating point. Similarly, uncertainties are propagated and uncertainty boundaries established for mean values of mass flow error at each considered operating point.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A virtual flow meter, comprising:
  a processor-based controller configured to:
    select or receive a selection of an operating point related to a given flow rate of a phase of a production fluid;
    select or receive a selection of a nominal case;
    based on the operating point and the nominal case, generate a calculated outlet pressure and a calculated outlet temperature at a segment of interest;
    for each combination of a measured inlet pressure and associated error, a measured inlet temperature and associated error, a measured gas mass flow rate and associated error, a measured oil mass flow rate and associated error, and a measured water mass flow rate and associated error:
      derive an outlet pressure and an outlet temperature at the segment for each combination;

calculate an outlet pressure difference between the calculated outlet pressure for the nominal case and the outlet pressure calculated for each combination; and calculate an outlet temperature difference between the calculated outlet temperature for the nominal case and the outlet temperature calculated for each combination;

determine the largest outlet pressure difference and the largest outlet temperature difference for the combinations; and select the largest outlet pressure difference and the largest outlet temperature difference as uncertainties related to, respectively, the outlet pressure and outlet temperature calculated for the nominal case.

2. The virtual flow meter of claim 1, wherein the processor-based controller is further configured to calculate a pressure drop error by taking the difference of the calculated pressure drop and a measured pressure drop.

3. The virtual flow meter of claim 2, wherein the uncertainty associated with the pressure drop error is calculated by considering the propagation rule related to the difference and makes use of the uncertainties associated with the calculated pressure drop and measured pressure drop.

4. The virtual flow meter of claim 2, wherein the calculated pressure drop comprises the difference between the calculated outlet pressure and the measured inlet pressure.

5. The virtual flow meter of claim 2, wherein the measured pressure drop comprises the difference between an outlet pressure measurement and the measured inlet pressure.

6. The virtual flow meter of claim 1, wherein the processor-based controller is further configured to calculate a temperature drop error by taking the difference of the calculated temperature drop and a measured temperature drop.

7. The virtual flow meter of claim 6, wherein the uncertainty associated with the temperature drop error is calculated by considering the propagation rule related to the difference and makes use of the uncertainties associated with the calculated temperature drop and measured temperature drop.

8. The virtual flow meter of claim 6, wherein the calculated temperature drop comprises the difference between the calculated outlet temperature and the measured inlet temperature.

9. The virtual flow meter of claim 6, wherein the measured temperature drop comprises the difference between an outlet temperature measurement and the measured inlet temperature.

10. The virtual flow meter of claim 1, wherein the processor-based controller is further configured to tune the parameters of the virtual flow meter for the segment of interest based at least in part on the pressure and/or temperature drop errors and associated uncertainties.

11. A processor-based method for determining uncertainties associated with outlet temperature and outlet pressure of a segment of a fluid production network, comprising:
selecting or receiving a selection of an operating point related to a given flow rate of a phase of a production fluid;
selecting or receiving a selection of a nominal case;
based on the operating point and the nominal case, generating a calculated outlet pressure and a calculated outlet temperature at a segment of interest;
for each combination of a measured inlet pressure and associated error, a measured inlet temperature and associated error, a measured gas mass flow rate and associated error, a measured oil mass flow rate and associated error, and a measured water mass flow rate and associated error:
deriving an outlet pressure and an outlet temperature at the segment for each combination;
calculating an outlet pressure difference between the calculated outlet pressure for the nominal case and the outlet pressure calculated for each combination; and
calculating an outlet temperature difference between the calculated outlet temperature for the nominal case and the outlet temperature calculated for each combination;
determining the largest outlet pressure difference and the largest outlet temperature difference for the combinations; and
selecting the largest outlet pressure difference and the largest outlet temperature difference as uncertainties related to, respectively, the outlet pressure and outlet temperature calculated for the nominal case.

12. The method of claim 11, further comprising tuning the parameters of the virtual flow meter for the segment of interest based at least in part on the pressure and/or temperature drop errors and associated uncertainties.

13. The method of claim 11, further comprising:
calculating a pressure drop error by taking the difference of the calculated pressure drop and a measured pressure drop.

14. The method of claim 13, wherein the uncertainty associated with the pressure drop error is calculated by considering the propagation rule related to the difference and makes use of the uncertainties associated with the calculated pressure drop and measured pressure drop.

15. The method of claim 11, further comprising:
calculating a temperature drop error by taking the difference of the calculated temperature drop and a measured temperature drop.

16. The method of claim 15, wherein the uncertainty associated with the temperature drop error is calculated by considering the propagation rule related to the difference and makes use of the uncertainties associated with the calculated temperature drop and measured temperature drop.

17. A processor-based method for determining a pressure drop error for a segment of a fluid production network, comprising:
determining a calculated pressure drop for the segment by taking the difference between a calculated outlet pressure for the segment corresponding to a nominal case, determined using a forward model and a measured inlet pressure for the segment;
determining a measured pressure drop for the segment by taking the difference between an outlet pressure measurement for the segment and the measured inlet pressure;
calculating a pressure drop error for the segment by taking the difference of the calculated pressure drop and the measured pressure drop; and
tuning a calibration process associated with a multiphase flow model using the pressure drop error and associated uncertainty for the segment.

18. A processor-based method for determining a temperature drop error for a segment of a fluid production network, comprising:
determining a calculated temperature drop for the segment by taking the difference between a calculated outlet temperature for the segment corresponding to a nominal case, determined using a forward model and a measured inlet temperature for the segment;

determining a measured temperature drop for the segment by taking the difference between an outlet temperature measurement for the segment and the measured inlet temperature;

calculating a temperature drop error for the segment by taking the difference of the calculated temperature drop and the measured temperature drop; and tuning a calibration process associated with a multiphase flow model using the temperature drop error and associated uncertainty for the segment.

\* \* \* \* \*